US012573235B2

(12) United States Patent
Kim

(10) Patent No.: US 12,573,235 B2
(45) Date of Patent: Mar. 10, 2026

(54) DRIVER ANONYMITY-ENSURED SHARED VEHICLE-DRIVING INFORMATION MANAGEMENT SYSTEM AND METHOD

(71) Applicant: AIMATICS CO., LTD., Seoul (KR)

(72) Inventor: Jin Hyuck Kim, Seoul (KR)

(73) Assignee: AIMATICS CO., LTD., Seoul (KR)

( * ) Notice: Subject to any disclaimer, the term of this patent is extended or adjusted under 35 U.S.C. 154(b) by 158 days.

(21) Appl. No.: 18/686,867

(22) PCT Filed: Jun. 20, 2022

(86) PCT No.: PCT/KR2022/008673
§ 371 (c)(1),
(2) Date: Feb. 26, 2024

(87) PCT Pub. No.: WO2023/033325
PCT Pub. Date: Mar. 9, 2023

(65) Prior Publication Data
US 2024/0355139 A1 Oct. 24, 2024

(30) Foreign Application Priority Data

Aug. 31, 2021 (KR) ........................ 10-2021-0115336

(51) Int. Cl.
*G06V 10/82* (2022.01)
*G06V 40/16* (2022.01)
*G07C 5/02* (2006.01)

(52) U.S. Cl.
CPC ............ *G06V 40/168* (2022.01); *G06V 10/82* (2022.01); *G06V 40/161* (2022.01); *G06V 40/172* (2022.01); *G07C 5/02* (2013.01)

(58) Field of Classification Search
CPC .... G06V 40/168; G06V 10/82; G06V 40/161; G06V 40/172; G06V 20/56;

(Continued)

(56) References Cited

U.S. PATENT DOCUMENTS

| | | | |
|---|---|---|---|
| 2018/0046870 A1* | 2/2018 | Cordell | ................. G06V 20/58 |
| 2019/0147269 A1* | 5/2019 | Aoi | ...................... G06V 20/597 |
| | | | 382/103 |

(Continued)

FOREIGN PATENT DOCUMENTS

| | | |
|---|---|---|
| KR | 10-1122524 B1 | 3/2012 |
| KR | 10-2016-0139624 A | 12/2016 |

(Continued)

OTHER PUBLICATIONS

Joshua J. Engelsma et al., "HERS, Homomorphically Encrypted Representation Search", IEEE Transactions on Biometrics, Behaviro and Identity Science, May 21, 2021, pp. 1-15.

(Continued)

*Primary Examiner* — Alazar Tilahun
(74) *Attorney, Agent, or Firm* — You & IP, LLC

(57) ABSTRACT

A driver anonymity-ensured shared vehicle-driving information management system includes a main camera, a sensor, an auxiliary camera, a memory unit, and a processor. The processor includes a driving record generation section configured to generate a driving record of the vehicle on the basis of an image taken by the main camera and sensing data detected by the sensor, a facial feature vector extraction section configured to extract a driver facial feature vector by irreversibly encoding the driver image taken by the auxiliary camera so that the driver image is not able to be restored to the original driver image, and an anonymous driver driving information storage section configured to match the driver facial feature vector with the driving record and stores the matched data in the memory unit.

25 Claims, 12 Drawing Sheets

(58) Field of Classification Search
CPC ........ G06V 20/597; G06V 40/53; G07C 5/02;
G07C 5/08; G06F 21/6245; G06N 3/04;
G06N 3/045; G06N 3/08; G06Q 50/40
See application file for complete search history.

(56) References Cited

U.S. PATENT DOCUMENTS

| | | | |
|---|---|---|---|
| 2020/0110952 A1 | 4/2020 | Gleeson-May et al. | |
| 2020/0247321 A1* | 8/2020 | Kim ........................... B60R 1/04 | |
| 2020/0394390 A1* | 12/2020 | Zhang ................... G06V 20/59 | |
| 2021/0357670 A1* | 11/2021 | Wu ...................... G06V 20/597 | |

FOREIGN PATENT DOCUMENTS

| | | | |
|---|---|---|---|
| KR | 10-2017-0051197 A | 5/2017 | |
| KR | 10-1866768 B1 | 6/2018 | |
| KR | 10-1984284 B1 | 5/2019 | |
| KR | 10-2019-0134909 A | 12/2019 | |
| KR | 10-2020-0007143 A | 1/2020 | |
| KR | 10-2020-0128285 A | 11/2020 | |
| KR | 10-2020-0134667 A | 12/2020 | |
| WO | 2020050760 A1 | 3/2020 | |
| WO | 2021049219 A1 | 3/2021 | |

OTHER PUBLICATIONS

Extended European Search Report mailed on May 14, 2025.

* cited by examiner

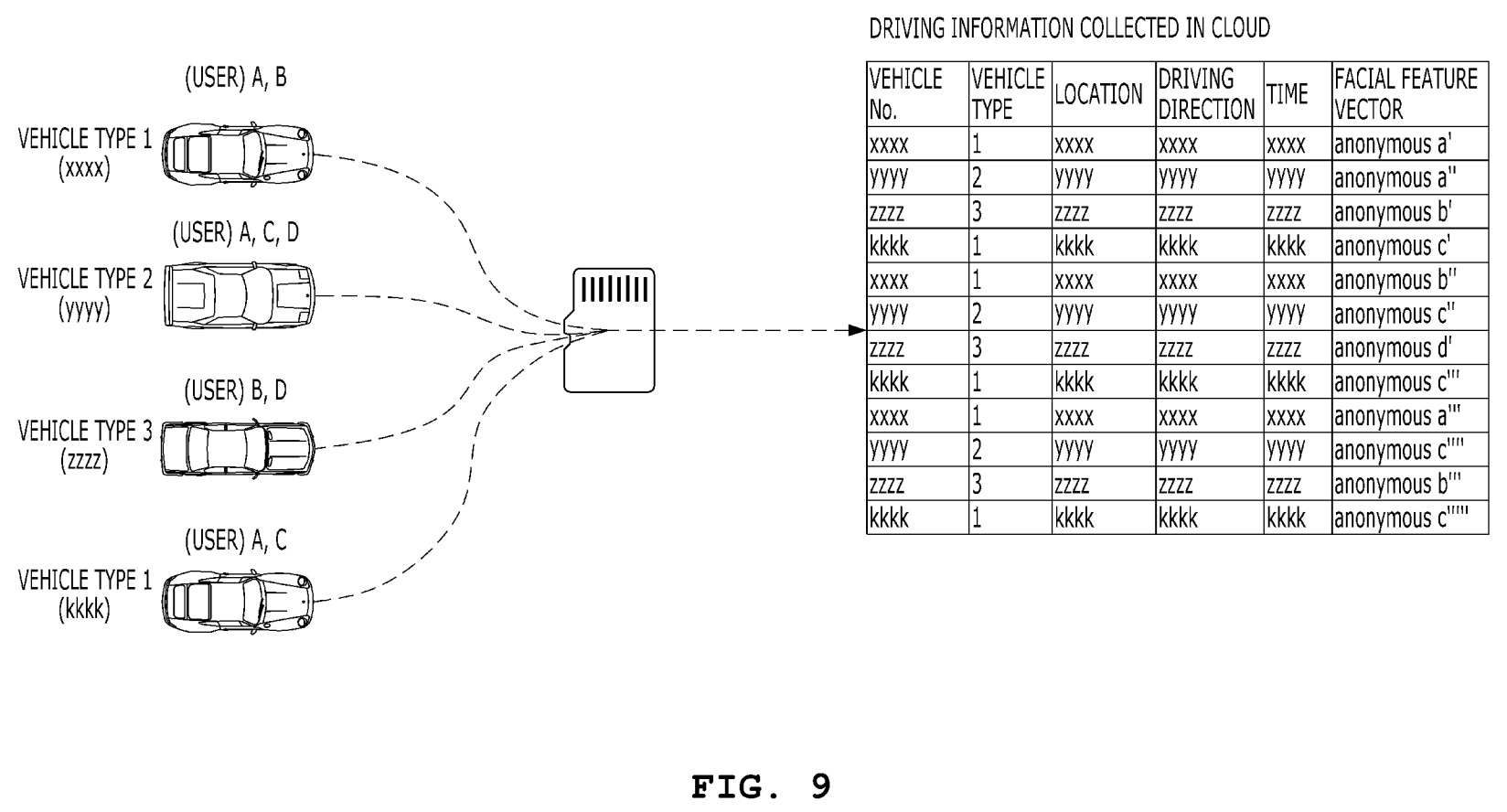

DRIVING INFORMATION COLLECTED IN CLOUD

| VEHICLE No. | VEHICLE TYPE | LOCATION | DRIVING DIRECTION | TIME | FACIAL FEATURE VECTOR |
|---|---|---|---|---|---|
| xxxx | 1 | xxxx | xxxx | xxxx | anonymous a' |
| yyyy | 2 | yyyy | yyyy | yyyy | anonymous a'' |
| zzzz | 3 | zzzz | zzzz | zzzz | anonymous b' |
| kkkk | 1 | kkkk | kkkk | kkkk | anonymous c' |
| xxxx | 1 | xxxx | xxxx | xxxx | anonymous b'' |
| yyyy | 2 | yyyy | yyyy | yyyy | anonymous c'' |
| zzzz | 3 | zzzz | zzzz | zzzz | anonymous d' |
| kkkk | 1 | kkkk | kkkk | kkkk | anonymous c''' |
| xxxx | 1 | xxxx | xxxx | xxxx | anonymous a''' |
| yyyy | 2 | yyyy | yyyy | yyyy | anonymous c'''' |
| zzzz | 3 | zzzz | zzzz | zzzz | anonymous b''' |
| kkkk | 1 | kkkk | kkkk | kkkk | anonymous c''''' |

(USER) A, B
VEHICLE TYPE 1 (xxxx)

(USER) A, C, D
VEHICLE TYPE 2 (yyyy)

(USER) B, D
VEHICLE TYPE 3 (zzzz)

(USER) A, C
VEHICLE TYPE 1 (kkkk)

FIG. 9

Figure 11:
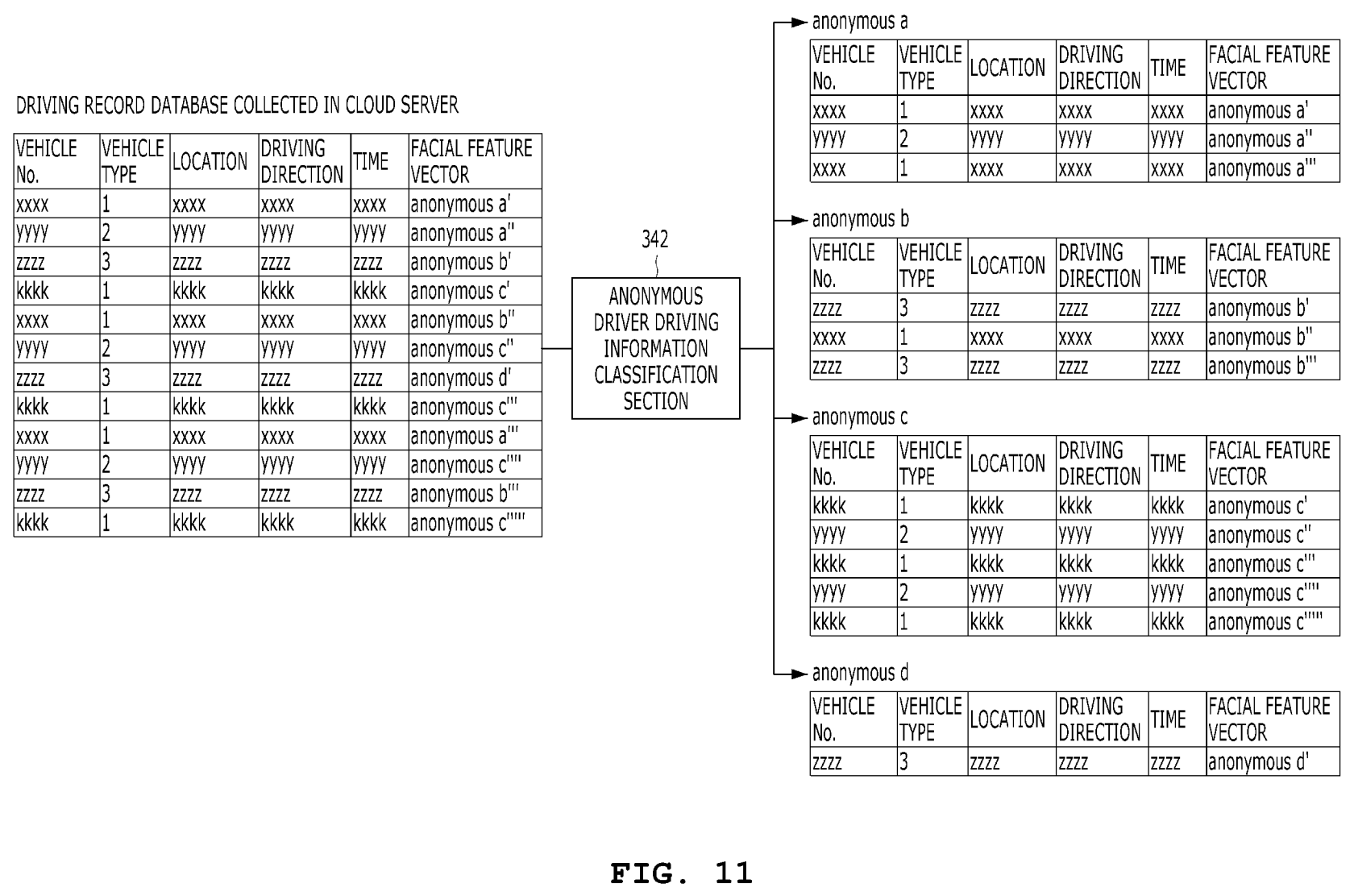

DRIVING RECORD DATABASE COLLECTED IN CLOUD SERVER

| VEHICLE No. | VEHICLE TYPE | LOCATION | DRIVING DIRECTION | TIME | FACIAL FEATURE VECTOR |
|---|---|---|---|---|---|
| xxxx | 1 | xxxx | xxxx | xxxx | anonymous a' |
| yyyy | 2 | yyyy | yyyy | yyyy | anonymous a'' |
| zzzz | 3 | zzzz | zzzz | zzzz | anonymous b' |
| kkkk | 1 | kkkk | kkkk | kkkk | anonymous c' |
| xxxx | 1 | xxxx | xxxx | xxxx | anonymous b'' |
| yyyy | 2 | yyyy | yyyy | yyyy | anonymous c'' |
| zzzz | 3 | zzzz | zzzz | zzzz | anonymous d' |
| kkkk | 1 | kkkk | kkkk | kkkk | anonymous c''' |
| xxxx | 1 | xxxx | xxxx | xxxx | anonymous a''' |
| yyyy | 2 | yyyy | yyyy | yyyy | anonymous c'''' |
| zzzz | 3 | zzzz | zzzz | zzzz | anonymous b''' |
| kkkk | 1 | kkkk | kkkk | kkkk | anonymous c''''' |

342

ANONYMOUS DRIVER DRIVING INFORMATION CLASSIFICATION SECTION anonymous a

| VEHICLE No. | VEHICLE TYPE | LOCATION | DRIVING DIRECTION | TIME | FACIAL FEATURE VECTOR |
|---|---|---|---|---|---|
| xxxx | 1 | xxxx | xxxx | xxxx | anonymous a' |
| yyyy | 2 | yyyy | yyyy | yyyy | anonymous a'' |
| xxxx | 1 | xxxx | xxxx | xxxx | anonymous a''' | anonymous b

| VEHICLE No. | VEHICLE TYPE | LOCATION | DRIVING DIRECTION | TIME | FACIAL FEATURE VECTOR |
|---|---|---|---|---|---|
| zzzz | 3 | zzzz | zzzz | zzzz | anonymous b' |
| xxxx | 1 | xxxx | xxxx | xxxx | anonymous b'' |
| zzzz | 3 | zzzz | zzzz | zzzz | anonymous b''' | anonymous c

| VEHICLE No. | VEHICLE TYPE | LOCATION | DRIVING DIRECTION | TIME | FACIAL FEATURE VECTOR |
|---|---|---|---|---|---|
| kkkk | 1 | kkkk | kkkk | kkkk | anonymous c' |
| yyyy | 2 | yyyy | yyyy | yyyy | anonymous c'' |
| kkkk | 1 | kkkk | kkkk | kkkk | anonymous c''' |
| yyyy | 2 | yyyy | yyyy | yyyy | anonymous c'''' |
| kkkk | 1 | kkkk | kkkk | kkkk | anonymous c''''' | anonymous d

| VEHICLE No. | VEHICLE TYPE | LOCATION | DRIVING DIRECTION | TIME | FACIAL FEATURE VECTOR |
|---|---|---|---|---|---|
| zzzz | 3 | zzzz | zzzz | zzzz | anonymous d' |

Figure 12:
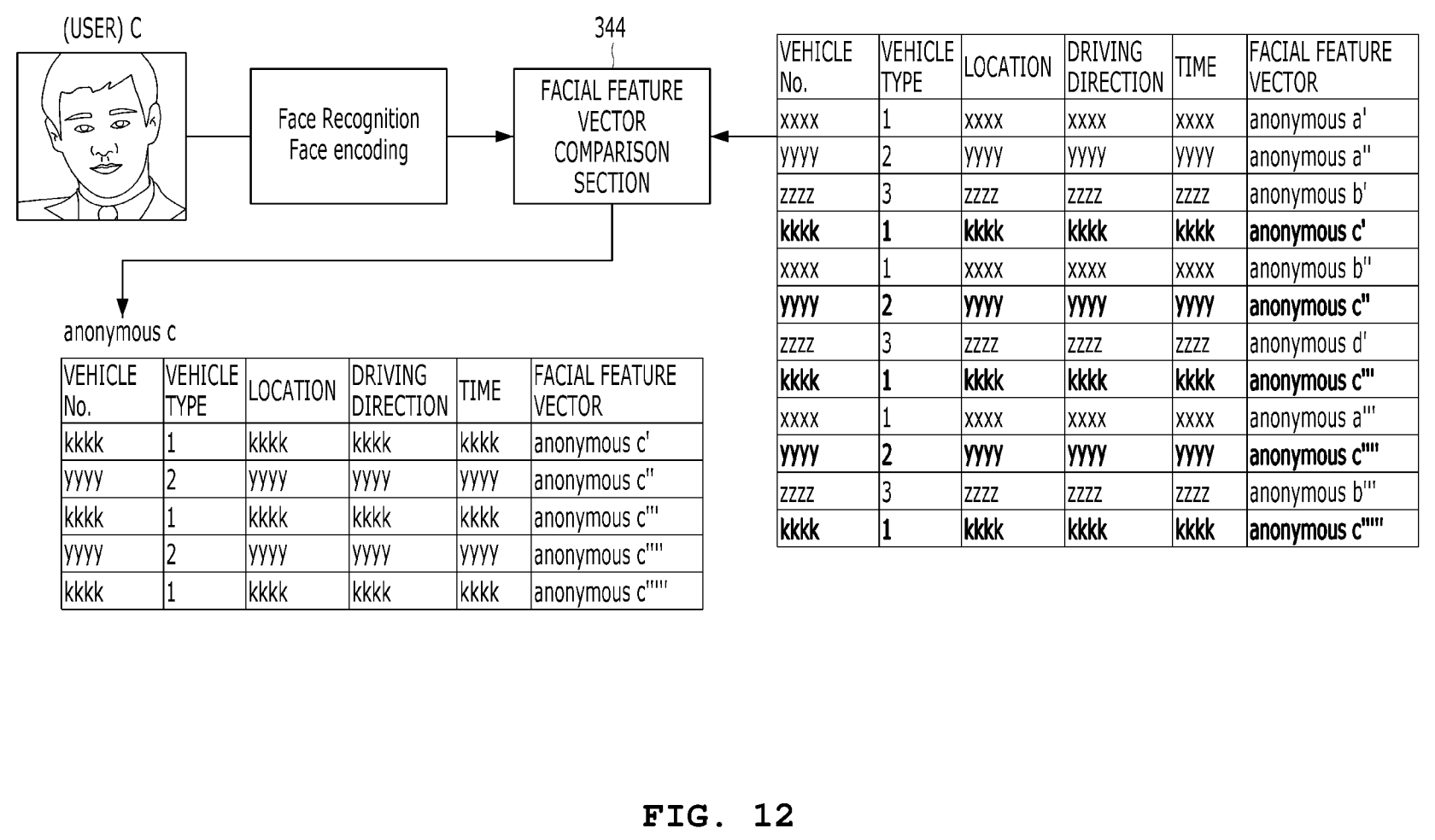

(USER) C

Face Recognition
Face encoding

344 — FACIAL FEATURE VECTOR COMPARISON SECTION

| VEHICLE No. | VEHICLE TYPE | LOCATION | DRIVING DIRECTION | TIME | FACIAL FEATURE VECTOR |
|---|---|---|---|---|---|
| xxxx | 1 | xxxx | xxxx | xxxx | anonymous a' |
| yyyy | 2 | yyyy | yyyy | yyyy | anonymous a'' |
| zzzz | 3 | zzzz | zzzz | zzzz | anonymous b' |
| kkkk | 1 | kkkk | kkkk | kkkk | anonymous c' |
| xxxx | 1 | xxxx | xxxx | xxxx | anonymous b'' |
| yyyy | 2 | yyyy | yyyy | yyyy | anonymous c'' |
| zzzz | 3 | zzzz | zzzz | zzzz | anonymous d' |
| kkkk | 1 | kkkk | kkkk | kkkk | anonymous c''' |
| xxxx | 1 | xxxx | xxxx | xxxx | anonymous a''' |
| yyyy | 2 | yyyy | yyyy | yyyy | anonymous c'''' |
| zzzz | 3 | zzzz | zzzz | zzzz | anonymous b''' |
| kkkk | 1 | kkkk | kkkk | kkkk | anonymous c''''' | anonymous c

| VEHICLE No. | VEHICLE TYPE | LOCATION | DRIVING DIRECTION | TIME | FACIAL FEATURE VECTOR |
|---|---|---|---|---|---|
| kkkk | 1 | kkkk | kkkk | kkkk | anonymous c' |
| yyyy | 2 | yyyy | yyyy | yyyy | anonymous c'' |
| kkkk | 1 | kkkk | kkkk | kkkk | anonymous c''' |
| yyyy | 2 | yyyy | yyyy | yyyy | anonymous c'''' |
| kkkk | 1 | kkkk | kkkk | kkkk | anonymous c''''' |

DRIVER ANONYMITY-ENSURED SHARED VEHICLE-DRIVING INFORMATION MANAGEMENT SYSTEM AND METHOD

TECHNICAL FIELD

The present disclosure relates to a shared vehicle-driving information management system and method, and more particularly, to a driver anonymity-ensured shared vehicle-driving information management system and method that irreversibly encodes driver images through machine learning to generate facial feature vectors and manages driving information of anonymous drivers on the basis of the facial feature vectors, thereby managing driving information for each driver and enabling identification of the same driver while protecting the driver's privacy and ensuring the driver anonymity.

BACKGROUND ART

Generally, a shared vehicle is a single vehicle shared by two or more drivers. In addition to commercial vehicles such as buses, taxis, trucks, and rental cars, there are many other types of shared vehicles, including corporate-owned vehicles, carpooling vehicles, etc. In addition, even privately owned vehicles may have more than one driver.

To efficiently manage shared vehicles, it is necessary to analyze the driving patterns of each driver. Driving patterns vary greatly from driver to driver. Analyzing different driving patterns is not only essential for effective management of shared vehicles, but also provides a great help in research for safe driving and autonomous driving of vehicles. Here, the important thing is to avoid driving data of different drivers from being mixed. This is because if drivers' driving data is mixed, consistent driving patterns may not emerge, which may lead to errors in data analysis.

U.S. Patent Publication No. 2020-0110952, entitled "SYSTEM AND METHOD FOR DETERMINING PROBABILITY THAT A VEHICLE DRIVER IS ASSOCIATED WITH A DRIVER IDENTIFIER," relates to a fleet management system (FMS) for determining whether a driver matches a driver identifier in the event of an accident in order to settle an insurance premium for a shared vehicle and determine the reason for the accident. Korean Patent Registration No. 10-1984284, entitled "AUTOMATED DRIVER MANAGEMENT SYSTEM USING MACHINE LEARNING MODEL," describes a technology that recognizes the driver's condition (drowsiness, etc.) with an internal camera and calculates the driver's driving score in real time to induce driver safety. Korean Patent Registration No. 10-1122524, entitled "METHOD AND SYSTEM FOR COLLECTING DRIVER FEATURE INFORMATION USING SYNCHRONIZED DATA," describes a method of synchronizing camera images and various sensor signals to identify and store drivers. Korean Patent Publication No. 10-2020-0128285, entitled "METHOD AND DEVICE FOR OPENING AND STARTING VEHICLE BASED ON FACIAL RECOGNITION," discloses a technology that recognizes a user's face from an externally mounted camera on a vehicle and allows the vehicle to be opened and closed only by the registered user. Korean Patent Registration No. 10-1866768, entitled "DRIVING ASSISTANCE DEVICE AND METHOD CONSIDERING DRIVER CHARACTERISTICS," discloses a technology that selects a driver model based on an image from an internal camera and selects the appropriate settings for that driver.

The enumerated related art technologies all propose methods of identifying a driver from driver images taken in a shared vehicle. These methods are directed to "driver's face ID," which has been considered a natural accompaniment to driver identification in shared vehicle management.

However, management methods using a driver's facial photograph image taken or driver's facial ID assigned have a major drawback in that the methods cannot protect driver's privacy. Many drivers do not want their facial images or ID stored in the driver's driving records. In addition, such driver's ID management methods are likely to violate privacy laws because the methods expose an individual's movements, making sensitive and private information publicly available. In addition, if vehicle interior images are stored, there is a high risk that the passengers' privacy may also be exposed. Furthermore, storing driver images or vehicle interior images requires a lot of storage space, and managing such image data problematically requires huge installation, communication, and management costs.

DISCLOSURE

Technical Problem

Various embodiments of the present disclosure are directed to a driver anonymity-ensured shared vehicle-driving information management system and method that irreversibly encodes a taken driver image to generate a facial feature vector, and manages driving information of an anonymous driver on the basis of the facial feature vector, thereby allowing driving information data of different drivers to be accurately classified and managed without being mixed together while protecting the driver's privacy and ensuring the driver anonymity.

Various embodiments of the present disclosure are also directed to a driver anonymity-ensured shared vehicle-driving information management system and method that enables the driver driving information to be read by comparing a taken driver image with the driver's consent with a pre-stored facial feature vector, so that when the shared vehicle service provider provides a store to the driver, settles the driver's insurance premium, determines the reason for the traffic accident, and so on, the shared vehicle service provider may utilize the driver driving information through the analysis of the driving records while ensuring the driver anonymity for the pre-stored driving information.

Technical Solution

In an embodiment of the present disclosure, a driver anonymity-ensured shared vehicle-driving information management system includes: a main camera installed in a vehicle to take an image on the front side of a vehicle; a sensor installed in the vehicle to detect at least one of a location, a driving direction, and a driving speed of the vehicle; an auxiliary camera provided to take a driver image inside the vehicle; a memory unit; and a processor mounted on an on-board device installed in the vehicle, the processor including: a driving record generation section configured to generate a driving record of the vehicle on the basis of an image taken by the main camera and sensing data detected by the sensor; a facial feature vector extraction section configured to extract a driver facial feature vector by irreversibly encoding the driver image taken by the auxiliary camera so that the driver image is not able to be restored to the original driver image; and an anonymous driver driving information storage section configured to match the driver facial feature vector with the driving record and stores the matched data in the memory unit.

In an embodiment of the present disclosure, a driver anonymity-ensured shared vehicle-driving information management method performed on an on-board device of a vehicle including a memory unit and a processor, the processor being configured to perform: (a) extracting a driver facial feature vector representative of information about driver facial features by irreversibly encoding a driver image taken by an auxiliary camera installed inside the vehicle so that the driver image is not able to be restored to an original driver image; (b) generating a driving record including at least one of current location information, driving direction information, and driving speed of the vehicle; and (c) matching the driving record generated in step (b) with the driver facial feature vector and storing the matched data in the memory unit.

In an embodiment of the present disclosure, a driver anonymity-ensured shared vehicle-driving information management method performed through communication between an on-board device of a vehicle and a cloud server, including a processor, at a remote location, the processor being configured to perform: (a) collecting from the on-board device driving records of the vehicle and driver facial feature vectors obtained by irreversibly encoding a driver image taken in the vehicle; and (b) classifying the driving records for each driver facial feature vector.

Advantageous Effects

The driver anonymity-ensured shared vehicle-driving information management system and method according to the present disclosure irreversibly encodes a taken driver image to generate a facial feature vector, and manages driving information of an anonymous driver on the basis of the facial feature vector, thereby allowing driving information data of different drivers to be accurately classified and managed without being mixed together while protecting the driver's privacy and ensuring the driver anonymity.

The driver anonymity-ensured shared vehicle-driving information management system and method according to the present disclosure enables the driver's driving information to be read by comparing a driver image taken with the driver's consent with a pre-stored facial feature vector, so that when the shared vehicle service provider provides a store to the driver, settles the driver's insurance premium, determines the reason for the traffic accident, and so on, the shared vehicle service provider may utilize the driver's driving information through the analysis of the driving records while ensuring the driver anonymity for the pre-stored driving information.

BRIEF DESCRIPTION OF DRAWINGS

FIG. 9 is a diagram illustrating a process of collecting anonymous driver driving information by the cloud server according to the present disclosure;

FIG. 11 is a diagram illustrating an example of how the cloud server classifies anonymous driver driving information according to the present disclosure; and FIG. 12 is a diagram illustrating an example of how the cloud server compares the anonymous driver driving information with the user's facial recognition information according to the present disclosure.

MODE FOR DISCLOSURE

Figure 1:
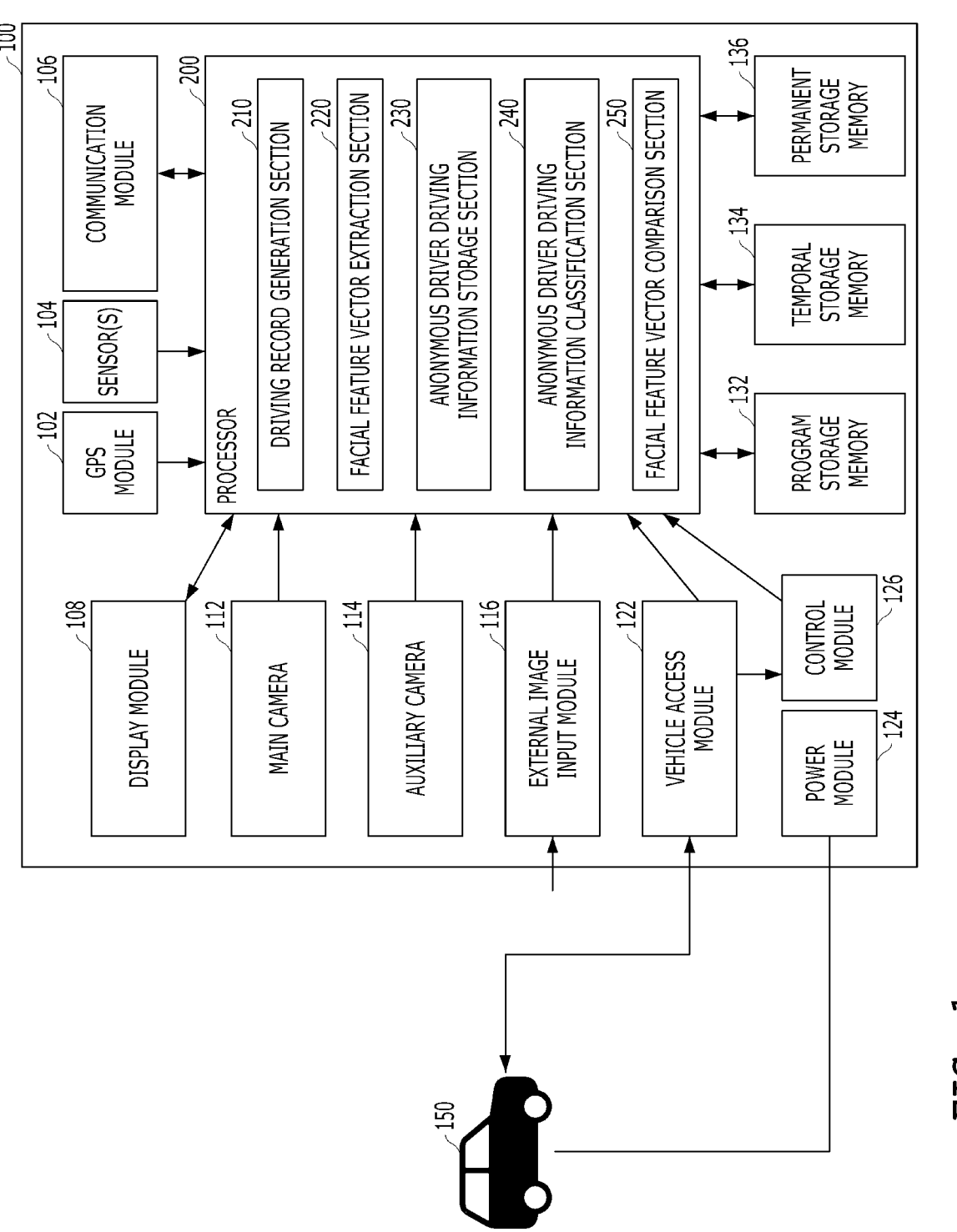
FIG. 1 is a block diagram illustrating a driver anonymity-ensured shared vehicle-driving information management system according to the present disclosure.

Specific embodiments according to the present disclosure will be described below with reference to the accompanying drawings. However, this is not intended to limit the invention to any particular embodiment, and is to be understood to include all modifications, equivalents, and substitutions that fall within the idea and technical scope of the invention.

Throughout the specification, parts having like construction and operation are designated by the same reference signs. In addition, the accompanying drawings of the present disclosure are for the convenience of illustration only, and shapes and relative dimensions thereof may be exaggerated or omitted.

In describing embodiments in detail, redundant descriptions or descriptions of techniques that are obvious in the field are omitted. In addition, whenever any part is the to "include" other components in the following description, it is intended to include components in addition to those listed, unless the contrary is specifically indicated.

In addition, terms such as "part," "section," "module," and the like used herein mean a unit that performs at least one function or operation, which may be implemented in hardware, software, or a combination of hardware and software. Also, when one part is the to be electrically connected to another part, this includes direct connections as well as connections with other configurations in between.

Terms containing ordinal numbers, such as first, second, and the like, may be used to describe various components, but the components are not limited by such terms. These terms are used only to distinguish one component from another. For example, a second component may be named as a first component, and similarly, a first component may be named as a second component, without departing from the scope of the present disclosure.

The present disclosure relates to a shared vehicle-driving information management system and method that irreversibly encodes driver images through machine learning to generate facial feature vectors and manages driving information of anonymous drivers on the basis of the facial feature vectors. In the present disclosure, "irreversibly encoding" refers to the process of encrypting or coding facial feature information and converting the encrypted or coded information into a vector form in such a way that the information cannot be decoded back to the original facial feature information. In other words, the driver facial feature vector irreversibly encoded by the present disclosure cannot be restored to the original driver facial image (or facial feature information that can be inferred from such an image).

In the shared vehicle-driving information management system and method, a driver image taken is only temporarily stored in a temporary storage memory and is not stored in a permanent storage memory. Furthermore, the driver image may be permanently deleted from the memory unit after the driver facial feature vector is generated. As a result, it is not possible for an on-board device of the vehicle or a remote cloud server to identify which driver the driving record was made by. However, the present disclosure, described below, may provide a method of substantially determining whether a driving record stored with a driver facial feature vector, either with the consent of a user or pursuant to a law enforcement warrant, was made by a certain user (or a criminal).

For example, when a shared vehicle management service provider wants; to provide certain benefits or incentives to drivers, to calculate a driver's insurance premium; to determine the reason for a traffic accident; or to match a particular driver's driving record with facial information provided pursuant to a law enforcement warrant through the analysis of the driving records, the service provider compares a pre-stored driver facial feature vector with a facial feature vector of a user who has consented to verify his/her driving record (or a criminal indicated by a warrant of a law enforcement agency), and determines that the person indicated by the two vectors is the same person if the error between the functions constituting the two vectors is within a predetermined error range. This allows either the vehicle's on-board device or a remotely located cloud server to enable the reading and comparison of driver-specific driving records stored in a storage medium while maintaining the anonymity of numerous drivers.

The main difference between the driver anonymity-ensured shared vehicle-driving information management system and method of the present disclosure and the conventional shared vehicle management is that the present disclosure does not store and manage the taken driver facial image or the unique ID assigned to the driver. Therefore, the present disclosure may systematically manage the driving information of a shared vehicle while protecting the driver's privacy and driver anonymity. Furthermore, the present disclosure may dramatically reduce the storage space of the on-board device and the communication cost and the operating cost of the cloud server system as there is no need to store and manage the vehicle interior images. Furthermore, the present disclosure may facilitate the introduction and spread of the shared vehicle management service by mitigating the reluctance of the drivers in introducing the shared vehicle management service and avoiding the violation of the privacy protection law.

On the other hand, the driver anonymity-ensured shared vehicle-driving information management system and method of the present disclosure may be performed entirely on the on-board device of the vehicle. Further, according to the driver anonymity-ensured shared vehicle-driving information management system and method of the present disclosure, the process of generating a driving record and extracting a driver facial feature vector and storing the extracted driver facial feature vector together with the driving record may be performed by the on-board device of the vehicle, and the process of managing the driving information of each vehicle (the information stored by matching the driver facial feature vector and the driving record), comparing the user facial feature vector extracted from an external input image with the pre-stored driver facial feature vector, and verifying the driving information by matching the user and the driver may be performed by a cloud server at a remote location. Hereinafter, the driver anonymity-ensured shared vehicle-driving information management system and method will be described in detail with reference to embodiments of the drawings.

FIG. 1 is a block diagram illustrating a driver anonymity-ensured shared vehicle-driving information management system of the present disclosure.

Referring to FIG. 1, the driver anonymity-ensured shared vehicle-driving information management system of the present disclosure may be implemented by an on-board device 100 installed in a vehicle 150. Referring to FIG. 1, the vehicle 150 is installed with a GPS module 102, a sensor 104, a communication module 106, a display module 108, a main camera 112, an auxiliary camera 114, an external image input module 116, a vehicle access module 122, a power module 124, a control module 126, a program storage memory 132, a temporary storage memory 134, a permanent storage memory 136, and a processor 200.

The GPS module 102 is a means for measuring the current location of the vehicle 150 by receiving signals from satellites. Sensors 104 are means for detecting the driving direction, position, speed, head angle, etc. of the vehicle. The sensor 104 may include a plurality of sensors or may be a module including a combination of a plurality of sensors. For example, the sensor 104 may include at least one of an acceleration sensor, an angular velocity sensor, an inertial sensor, and a geomagnetic sensor, or a combination thereof. The sensor 104 may also further include a temperature sensor, a current sensor, a voltage sensor, and the like for detecting status information of the vehicle. The communication module 106 is a means for the on-board device 100 to wirelessly communicate data with a cloud server system 300, described with reference to FIG. 2. The display module 108 is an output means for displaying driving-related information to the driver, displaying a destination guidance application, or displaying a graphical user interface (GUI) or touch user interface (TUI).

The main camera 112 is a device mounted facing the front of the vehicle 150 to take an image of road conditions in front of the vehicle. The auxiliary camera 114 is oriented inside the vehicle 150 to take an image of the driver and the situation inside the vehicle from the interior of the vehicle. The external image input module 116 is a means of receiving external image input via a wired interface or a wireless interface. For example, a USB device may be used to input a user image(s) for comparison with a driver facial feature vector. Additionally, the user image(s) for comparison with the driver facial feature vector may be input wirelessly from a remote cloud server system 300.

The vehicle access module 122 is a means for interfacing with the vehicle 150 to receive signals related to driving information from an electronic control unit in the vehicle 150. For example, the on-board device 100 of the present disclosure may be used to receive at least one of a speed signal, a brake signal, a turn signal, and an accumulated mileage signal over a network in the vehicle 150 so as to generate a driving record. The power module 124 is a means for supplying vehicle battery power to the components in the on-board device 100, and the control module 126 is a means for controlling the operation of the components in the on-board device 100.

Referring to FIG. 1, three memory units are installed in the on-board device 100. Program storage memory 132 is a memory device that stores computer-readable instructions executed by a processor 200. Program storage memory 132 is erasable and rewritable memory that retains data even when power is turned off. The temporary storage memory 134 is a memory device that temporarily stores processing data processed by the processor 200. The temporary storage memory 134 is configured as a volatile memory device in which data is readable/writable quickly and volatilized when power is turned off, to store a taken driver image, intermediate processing data of the processor, and data that is temporarily required during operation of the processor. The permanent storage memory 136 is a memory device that permanently stores processing data of the processor 200. The permanent storage memory 136 is configured as a non-volatile memory device that retains data even when the power is turned off and may be erased and rewritten, to store the driving records and the driver facial feature vector described below. The permanent storage memory 136 may further store state information of the vehicle, information about an event (such as a collision of the vehicle, etc.), a front image upon the occurrence of the event, and the like, and may be removably installed in the on-board device 100.

The processor 200 may include a single processor or a multiprocessor as a means for executing a series of processing steps of generating driving records, extracting driver facial feature vectors, matching the driver facial feature vectors with the driving records and storing the matched data, classifying driving information for each anonymous driver, and comparing external input images with driver facial feature vectors in accordance with the present disclosure. The processor 200 calls the program storage memory 132 to execute the processing instructions. The processor 200 includes a driving record generation section 210, a facial feature vector extraction section 220, an anonymous driver driving information storage section 230, an anonymous driver driving information classification section 240, and a facial feature vector comparison section 250. The components of the processor 200 may include a machine learning, deep learning, or other artificial intelligence learning model.

The driving record generation section 210 generates a driving record of the vehicle based on the images taken by the main camera 112 and the sensing data detected by the sensor 104. The driving record includes at least current location information, driving direction information, and driving speed information of the vehicle. The driving record may also include image data of the front of the vehicle taken by the main camera 112.

The facial feature vector extraction section 220 irreversibly encodes the driver image taken by the auxiliary camera 114 to extract a driver facial feature vector. The process by which the facial feature vector extraction section 220 extracts the driver facial feature vector will be described in more detail with reference to FIGS. 4 to 7.

Figure 8:
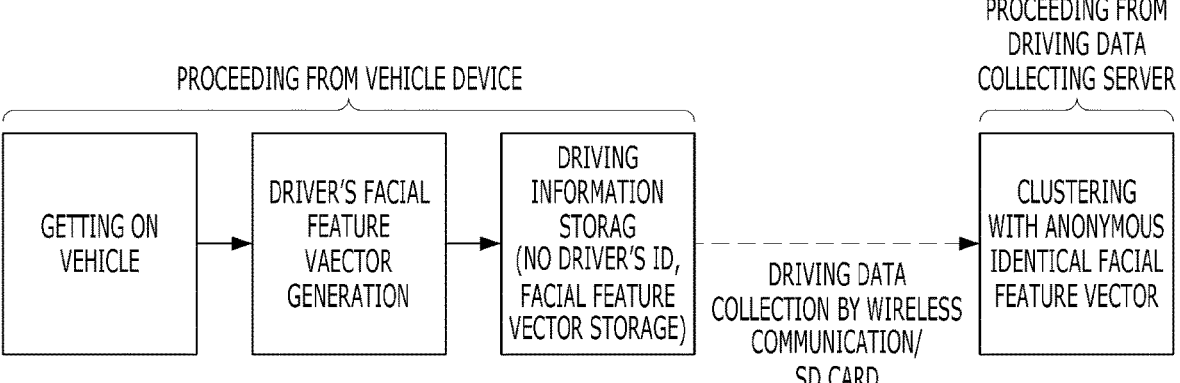
FIG. 8 is a diagram illustrating an example of an anonymous driver driving information classification task performed by a cloud server according to the present disclosure.

The anonymous driver driving information storage section 230 matches the driver facial feature vector with the driving record and stores the matched data in the permanent storage memory 136 of the memory unit. After the driver facial feature vector is generated, the anonymous driver driving information storage section 230 stores the driver facial feature vector along with information about time when the driving record was generated. Referring to FIGS. 8 and

9, the process of storing anonymous driver driving information will be described in detail.

Figure 10:
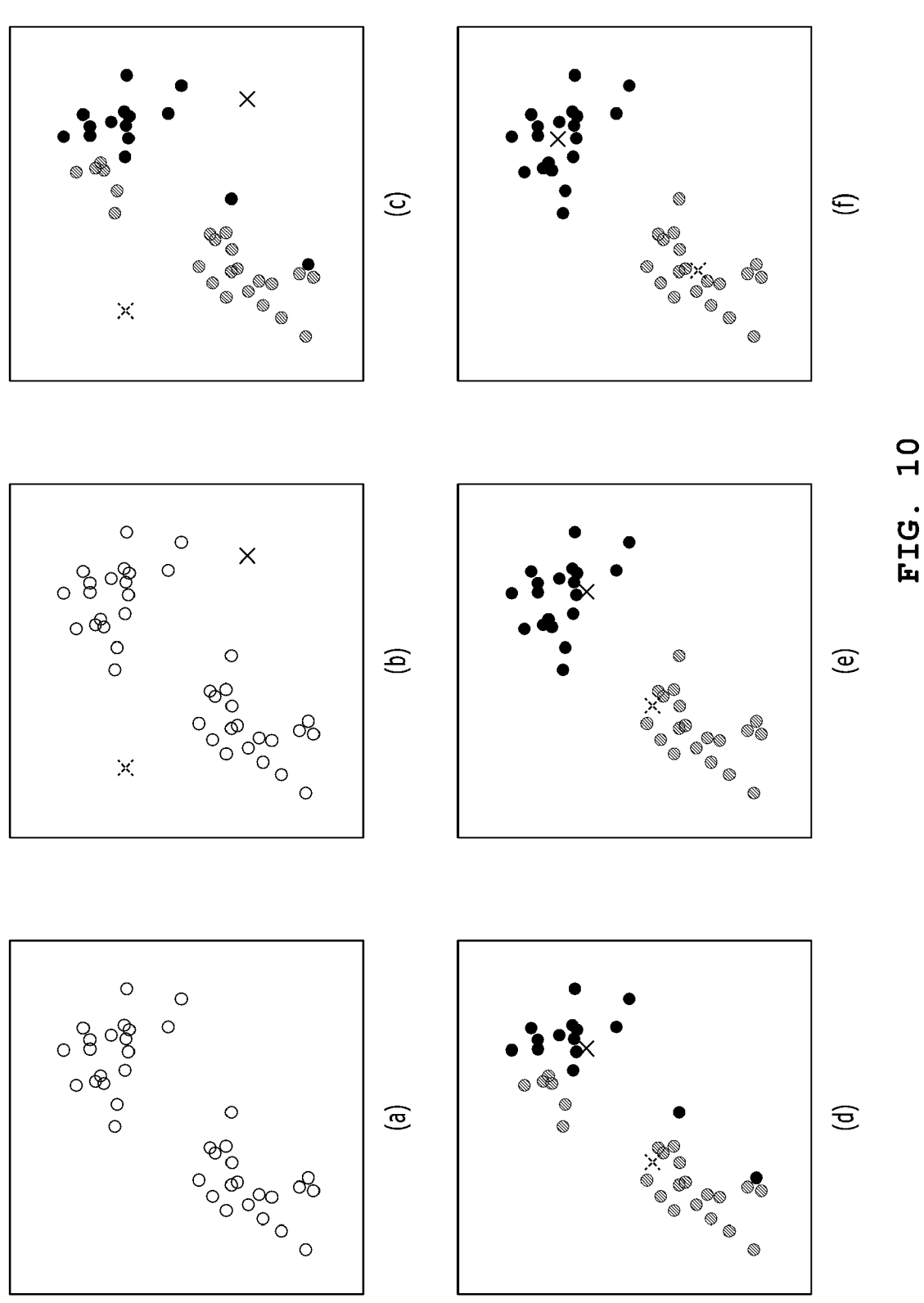
FIG. 10 is a diagram illustrating a clustering process of anonymous driver driving information according to the present disclosure.

The anonymous driver driving information classification section 240 classifies the driving record for each driver facial feature vector. The anonymous driver driving information classification section 240 may be provided in the cloud server system 300, or may be provided in both the on-board device 100 and the cloud server system 300. Referring to FIGS. 10 and 11, the process of classifying the anonymous driver driving information will be described in detail.

The facial feature vector comparison section 250 recognizes the user facial features included in the image input via the external image input module 116 and irreversibly encodes the information about the user facial features to extract the user facial feature vectors. The process of extracting the user facial feature vectors is substantially the same as the process of extracting the driver facial feature vectors. The facial feature vector comparison section 250 compares the user facial feature vector with the driver facial feature vector stored in the permanent storage memory 136 of the memory unit and outputs a comparison result. The facial feature vector comparison section 250 may also be provided in the cloud server system 300, or may be provided in both the on-board device 100 and the cloud server system 300. Referring now to FIG. 12, the process of comparing the driver facial feature vector and the user facial feature vector will be described in detail.

Figure 2:
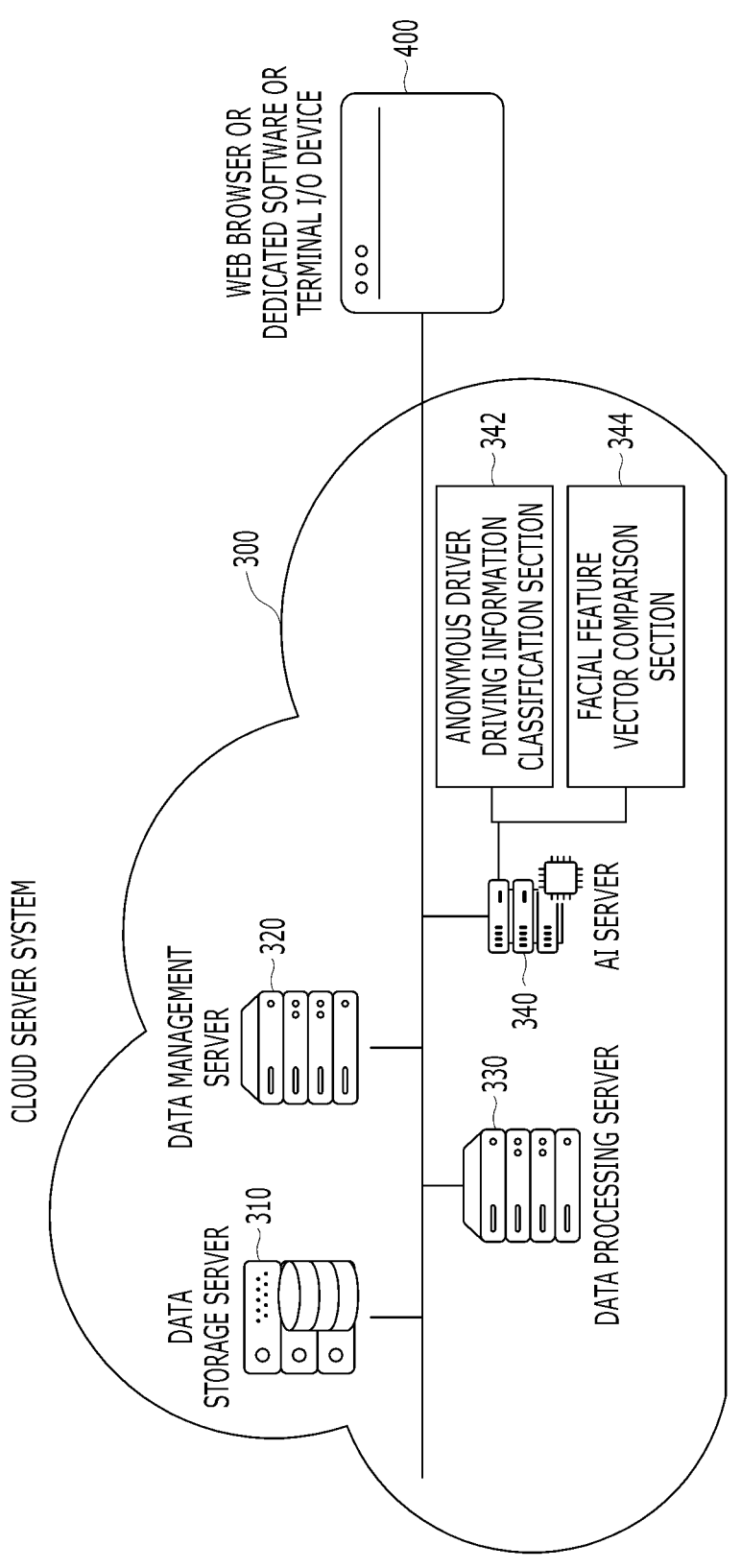
FIG. 2 is a block diagram illustrating a cloud server system in the driver anonymity-ensured shared vehicle-driving information management system according to the present disclosure.

FIG. 2 is a block diagram illustrating a cloud server system in the driver anonymity-ensured shared vehicledriving information management system of the present disclosure.

The cloud server system 300 is a server system that wirelessly communicates with the on-board device 100 of the vehicle 150 to collect, store, and manage the driving records and driver facial feature vectors described above. Referring to FIG. 2, the cloud server system 300 includes a data storage server 310, a data management server 320, a data processing server 330, and an artificial intelligence server 340.

The data storage server 310 is a server that stores data received from the on-board device 100. The driving records and driver facial feature vectors described above are matched to each other and stored in the data storage server 310. The data storage server 310 may also store common shared vehicle management information such as vehicle type information, status information, owner information, and the like of the vehicle 150.

The data management server 320 is a server that manages data such as driving records and driver facial feature vectors to manage data collection history, data storage time limit, data updates and deletions, and the like. The data processing server 330 is a server for processing data, and the artificial intelligence server 340 is a server for performing machine learning, deep learning, and other artificial intelligence learning for classifying and comparing driving information.

The artificial intelligence server 340 includes an anonymous driver driving information classification section 342 and a facial feature vector comparison section 344.

The anonymous driver driving information classification section 342 is a means for performing the same function as the anonymous driver driving information classification section 240 described with respect to the on-board device 100, which is to classify driving record for each driver facial feature vector.

The facial feature vector comparison section 344 is a means for performing the same function as the facial feature vector comparison section 250 described with respect to the on-board device 100, such as recognizing user facial features included in an input image input via an input unit, irreversibly encoding information about the facial features to extract user facial feature vectors, comparing the user facial feature vectors with driver facial feature vectors stored in the data storage server 310, and outputting a comparison result.

Here, the input unit may be a web browser 400, dedicated software, or a terminal input/output device for inputting an image containing the face of a user who has consented to the verification of his or her driver information, or of a criminal named in a law enforcement warrant. The anonymous driver driving information classification section 342 and the facial feature vector comparison section 344 will be described further with reference to FIGS. 10 to 12.

Figure 3:
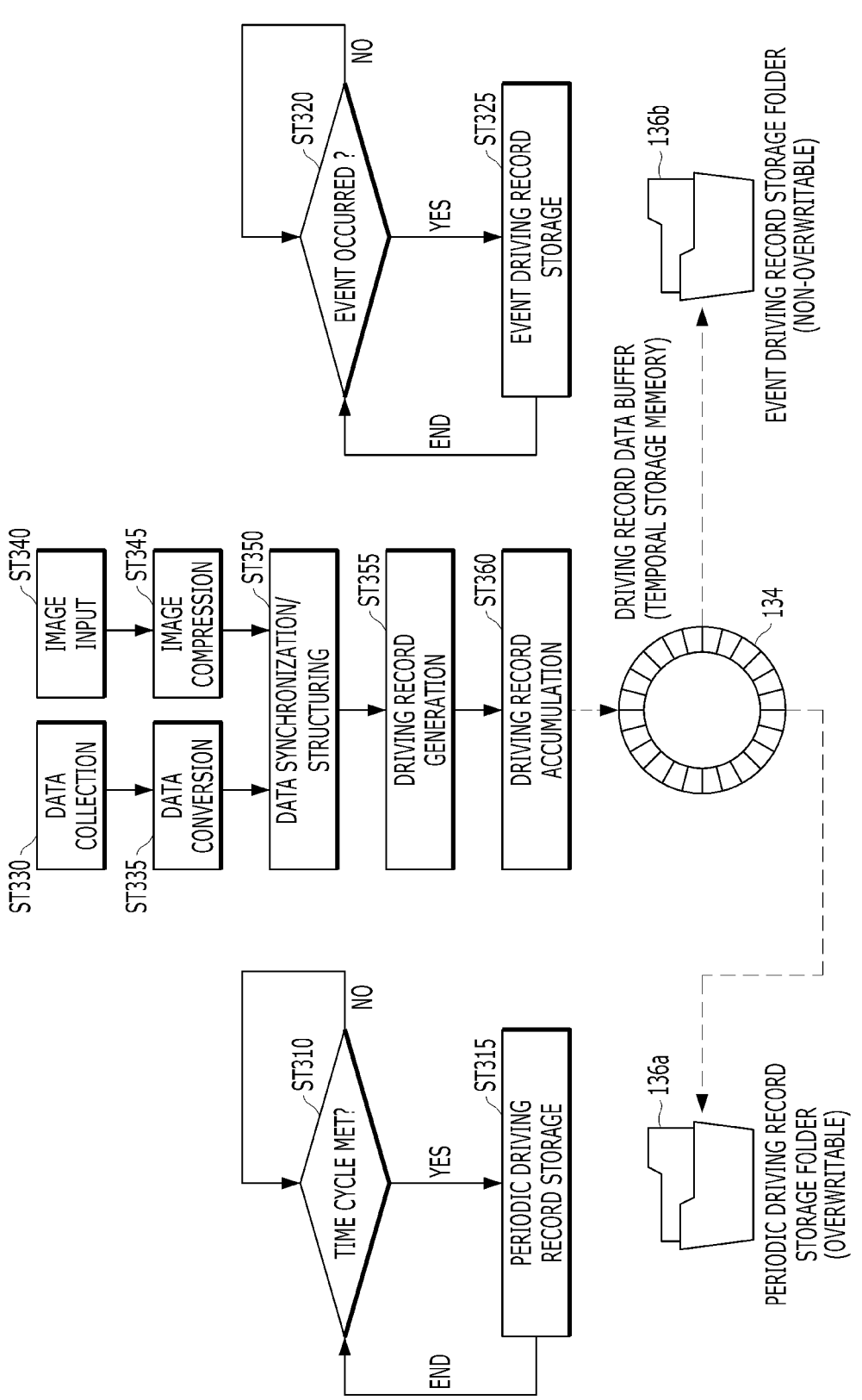
FIG. 3 is a flow diagram illustrating a process in which driving information for each driver is stored according to the present disclosure.

FIG. 3 is a flow diagram illustrating a process of storing driver-specific driving information according to the present disclosure. Referring to FIG. 3, a process in which a driving record is generated in the driving record generation section 210 of the on-board device 100 will be described below.

The driving record generation section 210 is configured to determine whether a time cycle has been met (ST310), periodically generate a driving record, and store the driving record in the memory unit (ST315). Further, the driving record generation section 210 is configured to determine whether an event has occurred (ST320) and store the driving record at the time of the event in the memory unit (ST325), even if the time cycle has not been met. For example, an event refers to an event that requires a driving record to be recorded, such as detection of an impact of the vehicle 150, detection of a driver's drowsy or inattentive state, etc.

The driving record generation section 210 is configured to store periodically generated driving records in an overwritable area of the permanent storage memory 136, and store driving records upon occurrence of an event in a non-overwritable area of the permanent storage memory 136.

Referring to FIG. 3, the driving record generation section 210 is configured to collect location data from the GPS module 102 and sensing data from the sensor 104 (ST330), and converts the collected data into computer-readable data (ST335). In addition, the driving record generation section 210 is configured to receive a front image of the vehicle from the main camera 112 (ST340) and compress the input image data (S345).

The driving record generation section 210 is configured to synchronize the digitally converted location data and sensing data and the compressed image data and structure the synchronized data into a set of data (ST350) to generate a driving record (ST355). The generated driving records are accumulated and stored in the temporary storage memory 134, which functions as a buffer. The driving record is then moved to an overwritable or non-overwritable area of the permanent storage memory 136 by determining whether the driving record is caused by a time cycle or an event occurrence.

Figure 4:
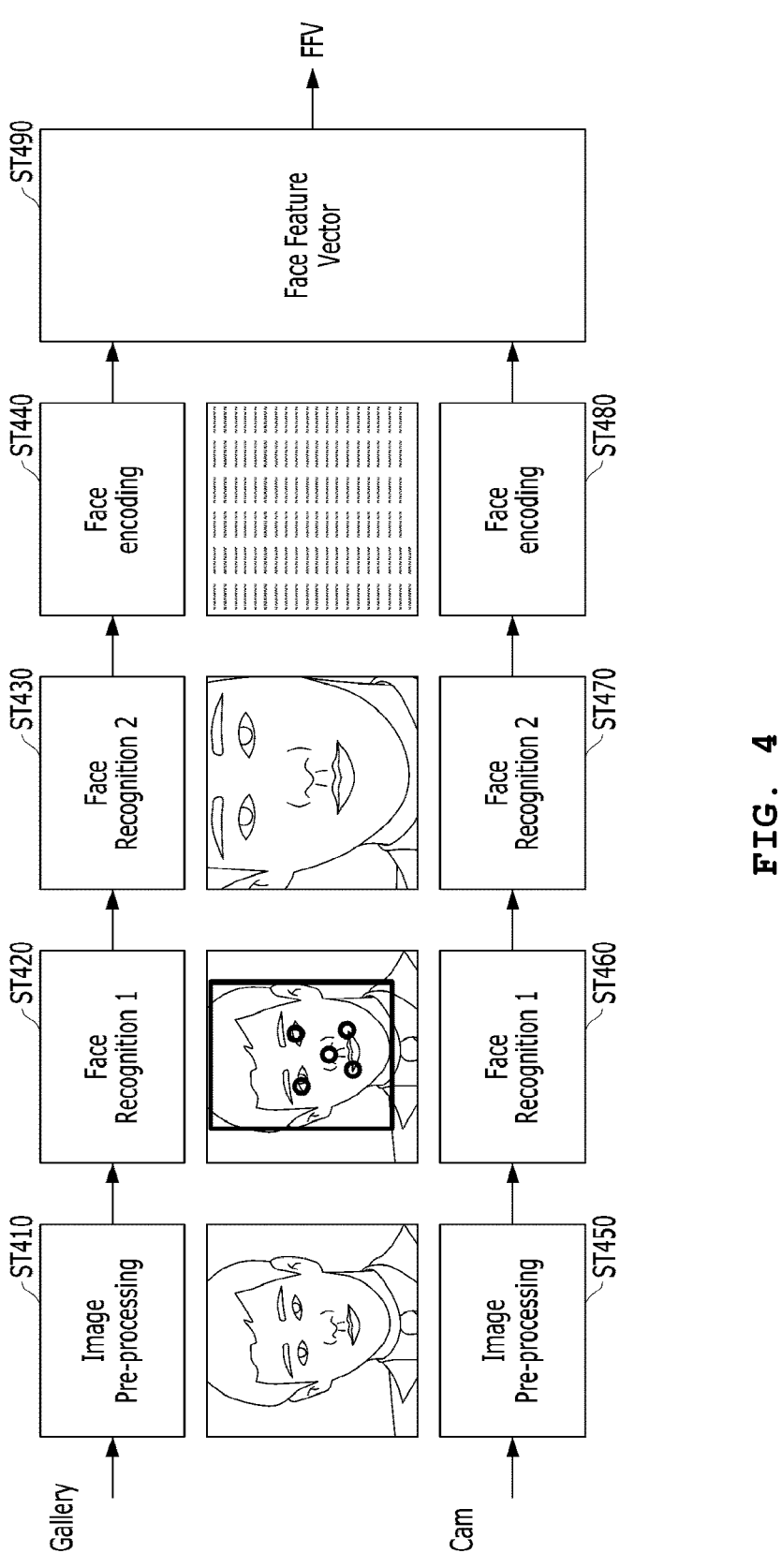
FIG. 4 is a flow diagram illustrating a process of irreversibly extracting a facial feature vector according to the present disclosure.
Figure 5:
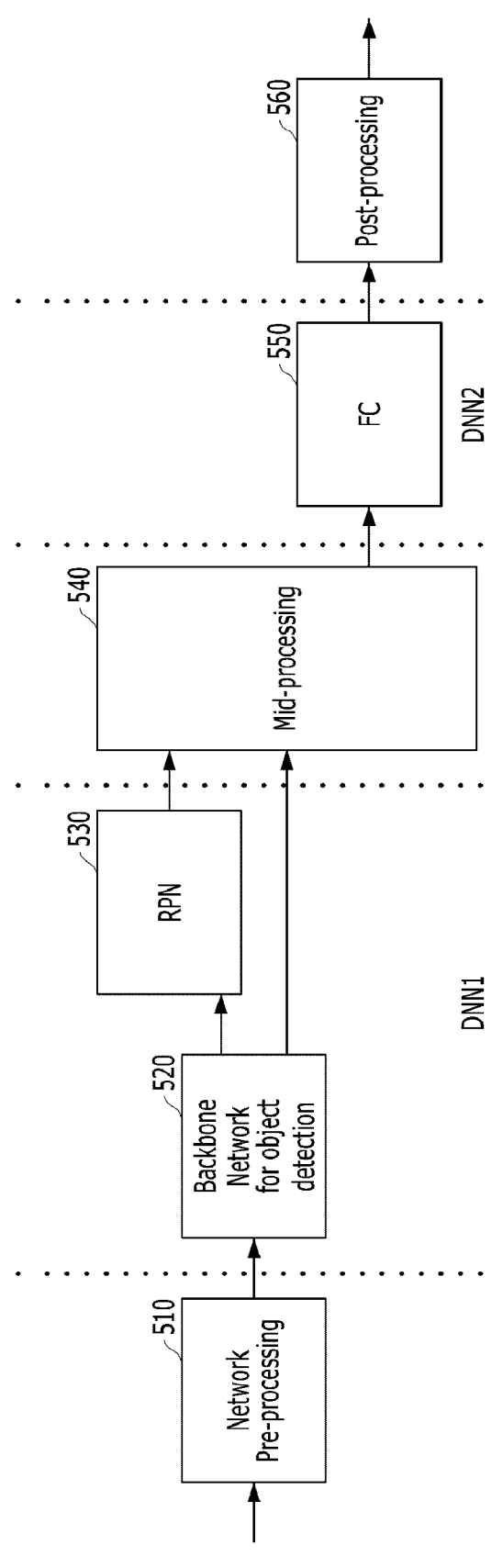
FIG. 5 is a block diagram illustrating a machine learning model for extracting facial feature vectors according to the present disclosure.
Figure 6:
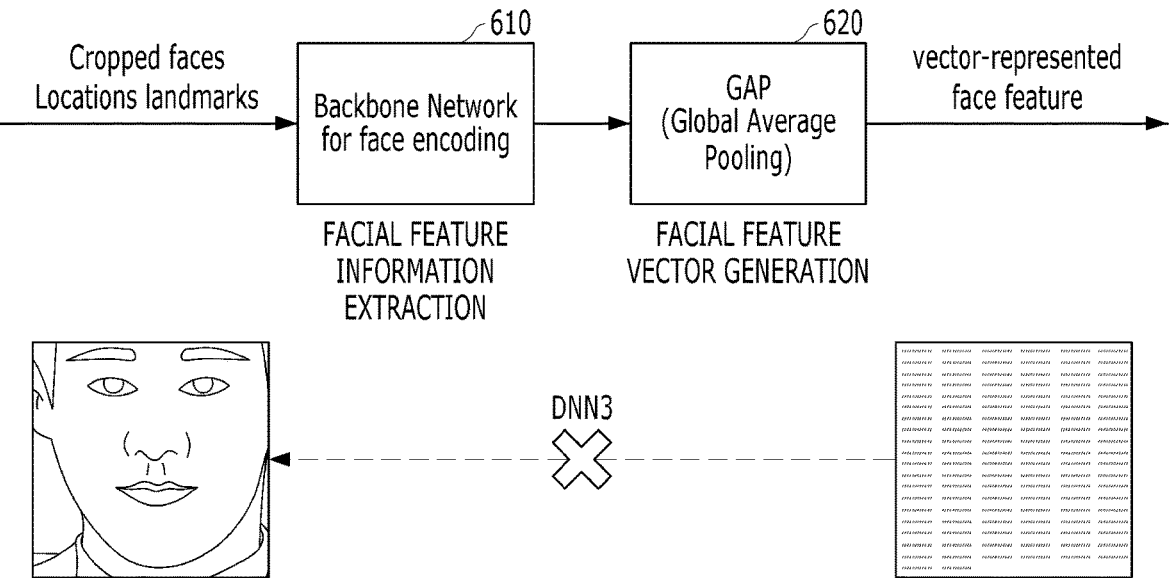
FIG. 6 is a block diagram illustrating a learning model for irreversibly encoding facial feature vectors according to the present disclosure.
Figure 7:
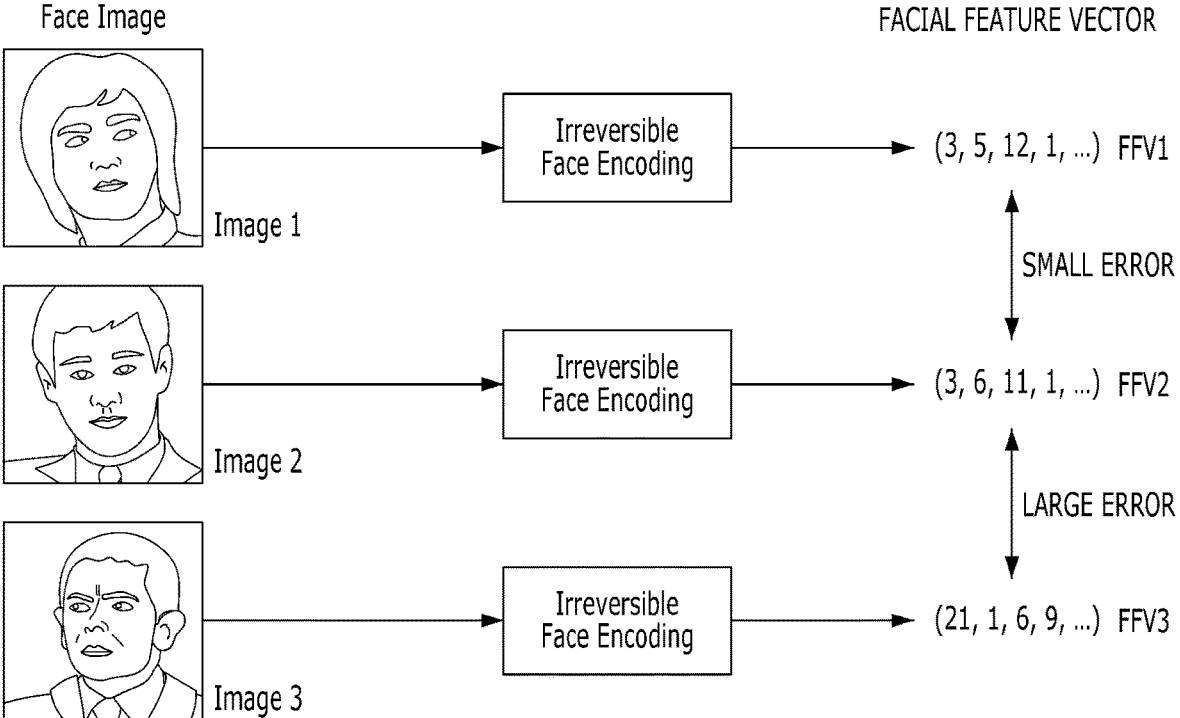
FIG. 7 is a diagram illustrating a model for comparing irreversibly encoded facial feature vectors according to the present disclosure.

FIG. 4 is a flow diagram illustrating a process of irreversibly extracting facial feature vectors according to the present disclosure, FIG. 5 is a block diagram illustrating a machine learning model for extracting facial feature vectors according to the present disclosure, FIG. 6 is a diagram illustrating a learning model for irreversibly encoding facial feature vectors according to the present disclosure, and FIG. 7 is a diagram illustrating a model for comparing irreversibly encoded facial feature vectors according to the present disclosure. Referring to FIGS. 4 to 7, the process of extracting the driver facial feature vector from the facial feature vector extraction section 220 of the on-board device 100 will be described below.

Referring to FIG. 4, the facial feature vector extraction section 220 performs image preprocessing (ST410) to normalize the driver image taken by the auxiliary camera 114 by performing at least one of image conversion (Resize) and image cropping (Crop). Subsequently, a first facial recognition step (ST420) of recognizing facial features (e.g., objects such as eyes, nose, mouth, etc.) from the preprocessed image and a second facial recognition step (ST430) of cropping the image along facial contours are performed. Next, the information about facial features is irreversibly encoded (ST440) to output a driver facial feature vector (ST490).

The flow illustrated at the bottom of FIG. 4 shows a process in which the facial feature vector comparison section 250 extracts a user facial feature vector from an external input image. Although the extraction of the user facial feature vector is described in the present disclosure as being performed by the facial feature vector comparison section 250, this is merely a functional classification of the subject of the processing, which may be identical to the process performed by the facial feature vector extraction section 220 and may also be performed by the facial feature vector extraction section 220.

The facial feature vector comparison section 250 may perform image preprocessing on an external input image including an image of a user's face (ST450), as described above, and may output a user facial feature vector (ST480) after irreversibly encoding information about facial feature points (ST490) through a first face recognition step (ST460) and a second face recognition step (ST470).

Referring to FIGS. 5 and 6, the facial feature vector extraction section 220 may include a plurality of deep neural network training sections to extract the driver facial feature vector through artificial intelligence learning. Of course, user facial feature vectors may also be extracted through the same artificial intelligence learning.

Referring to FIG. 5, a pre-processing section 510 is a learning network for image pre-processing, which is a learning network that processes the image normalization described in FIG. 4. The first deep neural network training section includes a plurality of convolutional layers having an object detector 520 and a region proposal network (RPN) 530. The object detector 520 detects all objects from the preprocessed image. The region proposal network 530 computes at least one region of interest (RoIs). The output of the region proposal network 530 is transmitted to a second deep neural network training section via an intermediate processing section 540.

The second deep neural network training section includes a second deep neural network 550 that detects objects by pooling the regions of interest (RoIs) and computes a classification layer of the detected objects to recognizes facial features. The output of the second deep neural network 550 is transmitted to a third deep neural network training section via a post-processing section 560.

Referring to FIG. 6, the third deep neural network training section includes an encoding unit 610 and a global average pooling unit 620. The encoding unit 610 extracts and encodes facial feature information for the recognized facial features, and the global average pooling unit 620 removes location information from the facial feature information, compresses the information into vector values, and irreversibly encodes the information to output a driver facial feature vector. As illustrated at the bottom of FIG. 6, the final extracted driver facial feature vector is irreversible data that is not able to be restored to the previous driver image.

Referring to FIG. 7, Image1 and Image2 are images of the same driver, and Image3 represents an image of a different driver. The driver facial feature vector irreversibly encoded by the facial feature vector extraction section 220 for Image1 is represented by (3, 5, 12, 1, . . . ), and the driver facial feature vector irreversibly encoded for Image2 is represented by (3, 6, 11, 1, . . . ). In the present disclosure, the driver facial feature vector may be represented as a vector of one or more functions arranged in rows and columns, but in the illustrated example, the driver facial feature vector is depicted as a vector function with a single row to facilitate understanding of the invention. A comparison of the driver facial feature vectors in Image1 and Image2 shows that the functions in the first and fourth columns are identical, while the functions in the second and third columns are slightly different. In this way, if the functions in the same rows and columns of two vectors are compared, and the error between the functions is within a predetermined error range, the person in the original image may be identified as the same person. For example, when comparing two vectors, if the proportion of identical functions is more than 50%, or the difference between different functions is within a predetermined error range, the person in the original image may be identified as the same person.

On the other hand, the irreversibly encoded driver facial feature vector of Image3 is represented by (21, 1, 6, 9, . . . ), and when compared to the driver facial feature vector of Image1 or Image2, it can be seen that all the features are different and the error between the features is large. As such, when the proportion of the same function is very small, or when the difference between different functions shows a large error range, the person in the original image may be identified as a different person.

FIG. 8 is a diagram illustrating an example of how the anonymous driver driving information classification task is performed by a cloud server according to the present disclosure, and FIG. 9 is a diagram illustrating an example of how the cloud server collects the anonymous driver driving information according to the present disclosure. Referring to FIGS. 8 and 9, a process in which the anonymous driver driving information storage section 230 of the on-board device 100 stores anonymous driver driving information will be described below.

Referring to FIG. 8, when a driver enters the vehicle 150, an image of the driver is taken by the auxiliary camera 114. The facial feature vector extraction section 220 then extracts a driver facial feature vector as described above. The extracted facial feature vector is valid until the driver gets off the vehicle. The anonymous driver driving information storage section 230 stores the driver facial feature vector from the time the driver gets on to the time the driver gets off in the memory unit together with the driving record generated with respect to FIG. 3. At this time, the driver ID does not exist. The driving information of the anonymous driver (the driving record stored in synchronization with the driver facial feature vector) may be classified and stored for each driver facial feature vector by the on-board device 100 itself. Furthermore, as illustrated in FIG. 8, the driving information of the anonymous driver may be aggregated and delivered to a cloud server via wireless communication or by an SD card or the like. The cloud server may also classify and store the driving information of the anonymous driver for each driver facial feature vector.

Referring to FIG. 9, the anonymous driver driving information may include data of a vehicle number, a vehicle type, a driving direction, a driving time, and a driver facial feature vector. In the example of FIG. 9, the vehicle number "xxxx" is used by anonymous drivers a', b", and a'" in chronological order. The on-board device 100 or the cloud server system 300 may classify the anonymous driver driving information by anonymous driver. For example, among the driving information for vehicle number "xxxx", anonymous drivers A' and A'" may be classified and managed as driving information by the same driver. The process of clustering and classifying driving information of a vehicle by anonymous drivers will be described in detail with reference to FIGS. 10 and 11.

FIG. 10 is a diagram illustrating a clustering process of anonymous driver driving information according to the present disclosure, and FIG. 11 is a diagram illustrating an example of classifying anonymous driver driving information by a cloud server according to the present disclosure.

Referring to FIG. 10, six driver facial feature vectors are illustrated. In each example, the vector values corresponding to the facial feature points are depicted as points on a two-dimensional screen. The clustering may be performed using K-means clustering on the basis of the distance between points. Here, "K" is the number of clusters (groups) expected to be found in the dataset. "Means" is the average distance from each data to the center of the cluster the data belongs to, and the goal of the process is to place the K centroids so that the average distance is minimized. First, K random centroids are placed each piece of data is assigned to the closest centroid to form a temporary cluster. Next, the centroids of the cluster are updated based on the data assigned to the cluster. The above process is repeated until convergence, i.e., no more centroids are updated. In this way, K clusters may be derived.

Referring to FIG. 11, the anonymous driver driving information classification section 342 of the cloud server system 300 may classify the anonymous driver driving information by comparing the functions of the same row and column of the driver facial feature vectors with each other, and defining the driver facial feature vectors whose error range between the functions is within a predetermined error range as the same driver facial feature vector. In this way, anonymous drivers a', a", and a'" are defined as the same driver a, and the driving records of the corresponding driver (anonymous drivers whose driver facial feature vectors are classified as similar) are classified into a single cluster. For example, the driving information of the anonymous driver a who drove the vehicles with the numbers "xxxx" and "yyyy" is classified into a single cluster. On the other hand, the same clustering and classifying criteria may also be applied to the process of comparing user facial feature vectors and driver facial feature vectors.

FIG. 12 is a diagram illustrating an example of how the cloud server compares and determines user's facial recognition information and anonymous driver driving information according to the present disclosure.

Referring to FIG. 12, the facial feature vector comparison section 344 of the cloud server system 300 (or the facial feature vector comparison section 250 of the on-board device 100) recognizes user facial features included in an input image input via an input unit, and irreversibly encodes information about the user facial features to extract user facial feature vectors. Then, the facial feature vector comparison section 344 compares the user facial feature vectors with the driver facial feature vectors and outputs the comparison result. At this time, the facial feature vector comparison section 344 compares the functions of the same rows and columns of the user facial feature vectors and the driver facial feature vectors, and determines that the person represented by the two vectors is the same person if the error range between the functions is within a predetermined error range.

This comparison of the two vectors by the facial feature vector comparison section 344 is similar to K-means clustering and classification as described above. If the image input via the input unit represents user c, the facial feature vector comparison section 344 may find the driving information by anonymous drivers c″, c″, and c‴ among the stored anonymous driver driving information and define the drivers as the same person, and output the clustering of the driving information of anonymous driver C as illustrated in FIG. 12.

The shared vehicle management service provider may use the resultant clustering results to provide incentives to the anonymous driver c who has performed safe driving, renew the insurance premium for the anonymous driver c, determine the reason for the traffic accident caused by the anonymous driver c, or respond to a record check on the anonymous driver c in accordance with a warrant from a law enforcement agency. At this time, the privacy and anonymity of other anonymous drivers stored in the cloud server system 300 may be protected. Furthermore, the records of the anonymous driver c after the temporary comparison of the driving information may be preserved in an anonymized state.

The invention disclosed above may be modified diversely without departing from the basic idea of the invention. In other words, all of the above embodiments are to be construed as exemplary and not limiting. Accordingly, the protection scope of the invention should be defined by the appended claims, not by the above embodiments, and any substitution of a component defined in the appended claims with an equivalent should be considered as falling within the protection scope of the invention.

The invention claimed is:

1. A driver anonymity-ensured shared vehicle-driving information management system comprises:
   a main camera configured to capture driving environment images surrounding a vehicle;
   a sensor configured to detect vehicle state data;
   an auxiliary camera configured to capture an original image of a driver;
   a memory configured to store program instructions and data; and
   a processor configured to:
      generate a driving record of the vehicle based on the driving environment images captured by the main camera and the vehicle state data;
      normalize the original image captured by the auxiliary camera;
      recognize facial features from the normalized original image, the facial features including eyes, nose, and mouth of the driver;
      extract a facial feature vector of the facial features;
      irreversibly encode the facial feature vector by removing spatial location information corresponding to the facial features, such that reconstruction of the original image of the driver from the facial feature vector is impossible;
      associate the facial feature vector of the driver with the driving record of the driver, and store the associated driving record in the memory;

retrieve the associated driving record stored in the memory by comparing a newly generated facial feature vector with facial feature vectors associated with driving records.

2. The driver anonymity-ensured shared vehicle-driving information management system of claim 1, wherein the sensor comprises at least one of a GPS module, an acceleration sensor, an angular velocity sensor, an inertial sensor, and a geomagnetic sensor.

3. The driver anonymity-ensured shared vehicle-driving information management system of claim 2, wherein the processor is configured to synchronize the driving record with the vehicle state data including speed, braking, and steering angle.

4. The driver anonymity-ensured shared vehicle-driving information management system of claim 1, wherein the processor is configured to generate the driving record in a standardized data format compatible with an external server.

5. The driver anonymity-ensured shared vehicle-driving information management system of claim 4, wherein the memory stores a plurality of driving records indexed by time and vehicle location information.

6. The driver anonymity-ensured shared vehicle-driving information management system of claim 1, wherein the memory includes a program storage memory configured to store computer-readable instructions executed by the processor, a temporary storage memory configured to temporarily store processing data processed by the processor, and a permanent storage memory configured to permanently store the processing data.

7. The driver anonymity-ensured shared vehicle-driving information management system of claim 6, wherein the processor is further configured to encrypt the driving record prior to store in the memory.

8. The driver anonymity-ensured shared vehicle-driving information management system of claim 7, wherein the processor is configured to transmit the encrypted driving record to a remote server via wireless communication.

9. The driver anonymity-ensured shared vehicle-driving information management system of claim 1, further comprising a deep neural network processor configured to detect objects by pooling regions of interest (RoIs) and recognize the facial features by calculating a classification layer of the detected objects.

10. The driver anonymity-ensured shared vehicle-driving information management system of claim 1, wherein the extraction of the facial feature vector is performed by a deep neural network processor.

11. The driver anonymity-ensured shared vehicle-driving information management system of claim 1, wherein the processor is configured to permanently delete, from the memory, the original image of the driver taken by the auxiliary camera after the extraction of the facial feature vector is completed.

12. The driver anonymity-ensured shared vehicle-driving information management system of claim 1, wherein the memory stores the facial feature vector after the facial feature vector is generated, along with information about time when the driving record was generated.

13. The driver anonymity-ensured shared vehicle-driving information management system of claim 1, wherein the processor is configured to classify the driving record according to an anonymous driver identifier generated from the facial feature vector.

14. The driver anonymity-ensured shared vehicle-driving information management system of claim 13, wherein the processor is configured to update the anonymous driver identifier when a similarity threshold with the newly generated facial feature vector exceeds a predetermined value.

15. The driver anonymity-ensured shared vehicle-driving information management system of claim 1, further comprising a cloud server wirelessly communicating with the vehicle to remotely collect, store, and manage the driving records and the driver facial feature vector.

16. The driver anonymity-ensured shared vehicle-driving information management system of claim 15, wherein the processor is configured to group multiple driving records associated with identical facial feature vectors into a cluster without restoring the original driver image.

17. The driver anonymity-ensured shared vehicle-driving information management system of claim 15, wherein the cloud server further comprises a face feature vector comparison processor configured to recognize user facial features included in an input image input via an input unit, irreversibly encode information about the user facial features to extract a user facial feature vector, and compare the user facial feature vector with the driver facial feature vector to output a comparison result.

18. The driver anonymity-ensured shared vehicle-driving information management system of claim 17, wherein the processor is configured to generate the facial feature vector with an error-tolerant encoding scheme to ensure non-reversible anonymization.

19. A driver anonymity-ensured shared vehicle-driving information management method performed on an on-board device of a vehicle including a memory and a processor, the processor being configured to perform:

generating a driving record of the vehicle based on driving environment images captured by a main camera and vehicle state data detected by a sensor;

normalizing an original image of a driver captured by an auxiliary camera;

recognizing facial features from the normalized original image, the facial features including eyes, nose, and mouth of the driver;

extracting a facial feature vector of the facial features;

irreversibly encoding the facial feature vector by removing spatial location information corresponding to the facial features, such that reconstruction of the original image of the driver from the facial feature vector is impossible;

associating the facial feature vector of the driver with the driving record of the driver, and store the associated driving record in the memory; and retrieving the associated driving record stored in the memory by comparing a newly generated facial feature vector with facial feature vectors associated with driving records.

20. The driver anonymity-ensured shared vehicle-driving information management method of claim 19, wherein the recognition of the facial features is performed by a deep neural network processor configured to detect objects by pooling regions of interest (Rols) and calculate a classification layer of the detected objects to recognize the facial features.

21. The driver anonymity-ensured shared vehicle-driving information management method of claim 19, wherein the extraction of the facial feature vector is performed by a deep neural network.

22. The driver anonymity-ensured shared vehicle-driving information management method of claim 19, wherein the processor is configured to permanently delete, from the memory, the original image of the driver captured by the auxiliary camera after the extraction of the facial feature vector is completed.

23. A driver anonymity-ensured shared vehicle-driving information management method performed through communication between an on-board device of a vehicle and a remote cloud server including a processor, the on-board device of the vehicle:

generating a driving record of the vehicle based on driving environment images captured by a main camera and vehicle state data detected by a sensor;

normalizing an original image of a driver captured by an auxiliary camera;

recognizing facial features from the normalized original image, the facial features including eyes, nose, and mouth of the driver;

extracting a facial feature vector of the facial features;

irreversibly encoding the facial feature vector by removing spatial location information corresponding to the facial features, such that reconstruction of the original image of the driver from the facial feature vector is impossible;

associating the facial feature vector of the driver with the driving record of the driver, and store the associated driving record in the memory; and retrieving the associated driving record stored in the memory by comparing a newly generated facial feature vector with facial feature vectors associated with driving records, and the processor being configured to perform:

collecting from the on-board device the driving records of the vehicle and the facial feature vectors obtained by irreversibly encoding the original image taken in the vehicle so that the original image of the driver is not able to be restored from the facial feature vectors; and classifying the driving records by comparing functions of the same rows and columns of the facial feature vectors with each other and defining the facial feature vectors that are within a predetermined error range between the functions as the same driver facial feature vector.

24. The driver anonymity-ensured shared vehicle-driving information management method of claim 23, wherein the processor is configured to further perform:

receiving an external image;

recognizing user facial features included in the external image and irreversibly encoding information about the user facial features to extract a user facial feature vector; and comparing the user facial feature vector with the driver facial feature vector to output a comparison result.

25. The driver anonymity-ensured shared vehicle-driving information management method of claim 24, wherein the processor is configured to compare functions of the same rows and columns of the user facial feature vector and the driver facial feature vector and defines the person indicated by the user facial feature vector and the driver facial feature vector in which the error range between the functions is within a predetermined error range as the same person.

* * * * *